United States Patent Office 3,594,332
Patented July 20, 1971

3,594,332
SPHERICAL PARTICLES OF HYDROXIDE AND METHOD
Max Michel, Yerres, France, assignor to Produits Chimiques Pechiney-Saint-Gobain, Neuilly-sur-Seine, France
No Drawing. Filed July 2, 1968, Ser. No. 741,873
Claims priority, application France, July 4, 1967, 112,982; Mar. 1, 1968, 142,059
Int. Cl. B01j *11/44*
U.S. Cl. 252—448
8 Claims

ABSTRACT OF THE DISCLOSURE

The preparation of spherical particles of oxides characterized by high mechanical solidity in which at least two oxides are present in a concentration of 2 moles per liter and in the form of a sol or peptized suspension, mixed and flocculated by addition thereto of a base to raise the pH of the mixture, after which the flocculated mixture is worked to form a suspension of spherical particles which are washed, dried and, if desired, calcined at elevated temperatures.

---

This invention relates to spherical particles of hydroxides prepared from hydroxide sols and from peptized suspensions of such hydroxides and to the methods for the preparation of same.

The interest presented in the adsorption and catalyst techniques by the various mineral compounds, most frequently on the basis of diverse oxides and hydroxides, is well known. The chemical nature of these compounds is diverse depending on the objectives sought as well as their structure and texture. However, these characteristics alone are not sufficient industrially to define usable products. The shape of these products and their mechanical properties play an extremely important part in the question of load and wear losses due to crushing and attrition. For a long time the shapes used resulted from simple crushing or grinding of large masses, which were then applied to the products by extrusion or by pelleting. Thus the development of techniques in fluidized and moving beds demonstrated the interest in a spherical form which avoids as much as possible losses by crushing or attrition, which are inevitable consequences thereof. The spherical form can be obtained by gelification of drops of more or less large diameters from various sols in liquids having little, if any, miscibility with water or by pulverization of these same sols in different atmospheres where their solidification is effected to form small spherical particles by coagulation or by drying.

However, most of these shaping methods, although frequently leading to valuable industrial products, are not always free from drawbacks, amongst which may be cited the use of large quantities of different, frequently organic fluids, which must be separated from the products obtained, the need for large and expensive equipment and the difficulty to obtain products of the desired chemical compounds due to the obligatory nature of some of the compositions of the original sols. Moreover, the resistance to wear of certain of these products is sometimes not as good as may be desired or secured by the adding of binders which are not free from drawbacks from the chemical and catalytic standpoint.

Applicant has discovered a method for the production of spherical particles of high mechanical solidity based on hydroxides, which avoids these drawbacks, said method consisting in forming mixtures in which at least two hydroxides are present in the form of sols or peptized suspensions at high concentrations, at least on the order of two moles per liter for the total of these hydroxides to which other secondary mineral or organic ingredients or components may be added, to work these mixtures and flocculate these hydroxides followed by washing the suspensions of particles obtained, if necessary, and finally drying them with the latter operations being effected by techniques well known to the art.

In the line of new industrial products, the spherical particles obtained are also part of the present invention, as well as their use, particularly in adsorption and catalysis, after they have been subjected to treatments known to the prior art.

In carrying out the process of the present invention, very large evolutions are noted in the rheological properties of the treated mixtures. The hydroxide mixtures are presented initially, if the pH conditions are right, in the form of smooth, more or less thick pastes, depending upon the concentrations, a condition which is desirable to assure the desired homogeneity of the products. The flocculation, most frequently obtained by a change of the pH in the desired direction, modifies the product by changing it into a more or less wet powder and the mixing then transforms the powder into a more or less fluid suspension, depending upon the concentration. This suspension is formed unexpectedly by a dispersion of small spherical particles in a residual liquid medium which, in the simplest cases, may be practically nothing but water which can, in this particular instance, be readily eliminated by drying.

It goes without saying that many variations are possible in the operating conditions. These variations relate, for example, to the sources, the nature, the colloidal conditions and concentration of each of the hydroxides used, the nature and proportion of the added secondary components, the physical and chemical conditions realized during mixing and blending, such as the temperature and pH, and the technological process for mixing and blending methods that are used. Thus a temperature increase may give a structural evolution of the mixtures and the appearance of new crystalline varieties by combination of different ingredients. Finally, it is sometimes possible to obtain certain hydroxide in suitable form directly during the preliminary mixing operations by appropriate treatment in situ, such as adjustment of pH of solutions of compounds which can yield these hydroxides. This is accomplished, for example, from various salt solutions whose anions or cations are intended to yield certain ones of the hydroxides sought. It is obvious that, in certain cases, washings for the elimination of the residual salts are to be provided unless some of these are actually desirable in the finished product, as may be the case for catalysis.

The nature and the proportions of the added secondary components have relatively small influence on the success of the method for the formation of spherical particles in accordance with the practice of this invention, provided that these components do not change unfavorably the characteristics of the colloidal solutions or of the peptized suspensions of hydroxides, which must be blended, as, for example, from the effect of a dissolution or an excessive pH change. Moreover, the adding of such secondary components may be used to obtain the desired pH, although, in most cases, they only function in the formation phase of the spherical particles as charges which only play an active part during the transformations and applications of the spherical particles obtained. Among these additions can be mentioned organic or mineral particles, like sulphur or carbon, which are likely to leave pores of certain dimensions in the spherical particles after heat treatment of dissolutions, or, on the contrary, mineral products necessary for the desired catalytic role, when they are combined with the initial hydroxides. Among these mineral products, many may themselves be crystallized or non-crystallized hydroxides or oxides or natural or synthetic silicates of different types, such as clays or zeolites, or any other products whose actions, particularly their catalytic actions, are known from the prior art.

Finally, it goes without saying that in view of the applications, and primarily the catalytic applications of the spherical particles obtained in accordance with the practice of this invention, it is often necessary to subject them to conventional treatments, such for example as to steam, with or without pressure, or calcination at various temperatures, in order to confer upon them certain desired structure and texture characteristics.

The development of the texture and structure characteristics of the spherical particles can be achieved at low temperature, a little above ordinary temperature, and eventually in the presence of steam. In some cases, it is possible that the hydroxides and the different components of those particles react at these relatively low temperatures in order to form compounds, the crystallization of which is very clear.

Merely to illustrate the present invention, different examples are given below which, in view of the high interest in catalyst supports on silica and alumina bases, relate primarily to the formation of such supports in spherical particles based on silica sols, which either are prepared elsewhere or obtained in situ, and peptized alumina suspensions of various natures. Other examples are given wherein magnesia is added as a secondary component to the initial hydroxides, the latter portion of such examples illustrating the possibilities of structural and textural evolution of the products obatined by the practice of this invention. Finally, for certain ones of these examples, results are given relating to the mechanical strength of the spherical particles obtained in accordance with the methods of the present invention compared with those obtained from currently used industrial catalyst supports.

EXAMPLE 1

In a mixer having horizontal arms and a capacity of about 1 liter, a paste is formed with 320 g. of distilled water and 180 g. of alumina mono-hydrate, of the boehmite variety, reduced to a fine powder having a specific surface of 156 m.$^2$/g. and dispersible in water, representing 135 g. of alumina expressed as $Al_2O_3$. When the paste is perfectly homogeneous, 600 g. of a silica sol are added containing 30% by weight of silica, the alkaline pH of which has previously been modified to about 6 by a few drops of concentrated nitric acid. After a few minutes, the mixture looks like a homogeneous jelly. The pH is then increased to 8.5 with drops of a concentrated ammonia solution. The jelly is then quickly divided into a humid powder which blending eventually converts into a fluid suspension. This suspension, containing 28.6% by weight of oxides, expressed as $SiO_2$ and $Al_2O_3$, and whose ratio $SiO_2/Al_2O_3+SiO_2$ is 0.57, is oven dried at 110° C. It yields a fluent powder of perfectly individualized spherical particles having an average diameter, obtained by microscopic examination, in the vicinity of 60 microns. By dry screening, the granulometric distribution obtained is as follows:

6% >160 microns
160 microns >77.5% > 40 microns
16.5% < 40 microns

After calcination at 600° C., the particles have a specific surface of 198 m.$^2$/g. and constitute an excellent catalyst support which can be used in a fluid bed due to its high resistance to attrition. This resistance is shown by comparative tests for wear with a catalytic support that is atomized having identical dimensions and formed from silicon and alumina (identified as A) and with another likewise atomized support of identical dimensions, formed of attapulgite clay (called B). The following results define the total wear in percent obtained after 7 hours:

| | Percent |
|---|---|
| Particles of Example 1: | 13 |
| Support A | 46 |
| Support B | 27 |

EXAMPLE 2

The procedure is generally the same as that of the preceding Example 1 for the production of spherical particles with the use of the same original materials, but in which the proportions and concentrations are different so that the ratio $SiO_2/SiO_2+Al_2O_3$ is 0.20 and the percent of the dry oxides in the mixture is 16.4. The pH of the mixture, prior to blending, is adjusted to 7.5 with ammonia. The spherical particles obtained have an average diameter of 40 microns and, after calcination at 600° C., the specific surface is 210 m.$^2$/g.

EXAMPLE 3

The procedure is the same as that of the preceding examples for the production of spherical particles which makes use of the same ingredients except that the proportions and concentrations are different so that the ratio $SiO_2/SiO_2+Al_2O_3$ is 0.80 and the percent of dry oxides in the mixture is 27. The pH of the mixture, prior to blending, is adjusted to 8 by ammonia. The particles of spherical shape obtained after drying and calcining at 600° C. have a specific surface of 224 m.$^2$/g. Their ponderal granulometric distribution is as follows:

160 microns >35% >40 microns
62% <40 microns

EXAMPLE 4

The production of spherical particles is carried out in the same general manner as in the preceding examples, by means of the same ingredients but with different proportions and concentrations so that the ratio $$SiO_2/SiO_2+Al_2O_3$$

will be 0.50 and the percent dry oxides in the mixture is 32. The pH of the mixture, prior to blending, is adjusted to 8.5 with ammonia. The spherical particles obtained, after drying and calcination at 600° C., have a specific surface of 220 m.$^2$/g. and their ponderal granulometric distribution is as follows:

18% >1 mm.
1 mm. >10% >500µ
500µ >45% >250µ
250µ >12% >200µ
200µ >5% >160µ
160µ >6% >80µ

A comparative test for solidity carried out in the same manner as in Example 1 showed 5.5% wear in 7 hours for the particles of this Example 4 against 12% wear for attapulgite particles of analogous dimensions agglomerated in a rotary granulator.

The comparison of these four examples shows the influence of the concentration of the initial mixtures on the average diameter of the spherical particles obtained by the method of this invention and that it is possible to obtain various ranges of useful products on an industrial scale.

EXAMPLE 5

The procedure is generally the same as that for the preceding Examples 1 to 4. The starting materials are, on the one hand, the silica sol used in the preceding examples, and alumina trihydrate of the hydrargillite variety, on the other hand, obtained by evolution of an alumina gel at a temperature below 60° C. The alumina has a specific surface on the order of 100 m.$^2$/g. The proportions and concentrations of the ingredients are such that the ratio $SiO_2/SiO_2+Al_2O_3$ will be 0.70 and the percent dry oxides in the mixture is 33. The pH is adjusted, prior to kneading, to 7.5 with ammonia. The spherical particles obtained, after drying and calcining at 600° C., have a specific surface area of 280 m.²/g. and their ponderal granulometric distribution is as follows:

5.8% >160 microns
160 microns >89.5% >40 microns
4.7% <40 microns

EXAMPLE 6

The procedure is generally the same as that given for the preceding examples. Regarding alumina, 270 g. of boehmite of the type used in the preceding examples are employed and formed into a paste by means of 156 cm.³ of 3 N nitric acid, the silica being introduced into the blender in the form of 147 cm.³ of a 340 g. per liter solution of sodium silicate. The water is then added until the dry oxides represent 30% of the mixture and thereafter the pH is raised to 9.7 with ammonia. When the mixing is completed, spherical particles are obtained having a specific surface of 198 m.²/g., after washing, drying and calcining at 600° C., with the ponderal granulometric distribution being as follows:

200 microns >2% >160 microns
160 microns >53% >40 microns
45% <40 microns

The ratio $SiO_2/SiO_2+Al_2O_3$ is 0.20 for these particles.

EXAMPLE 7

This example relates to the preparation of spherical particles containing magnesia in addition to silica and alumina. The general process is the same as in the preceding examples. A mixture of 107 g. of the boehmite used in Examples 1, 2, 3, 4 and 6 is formed into a paste with 666 g. of silica sol containing 30% silica as used in the preceding Examples 1 to 5, and brought to a pH of 6. The jelly obtained is supplemented with 173 g. of crushed dry magnesium hydroxide $Mg(OH)_2$. The pH is adjusted to about 9. Upon completion of the mixing, spherical particles having a specific surface of 180 m.²/g. are obtained, after drying and calcining at 600° C., with the following ponderal granulometric distribution:

250 microns >5.5% >160 microns
160 microns >34% >80 microns
60.5% <80 microns

Their ponderal composition is as follows:

| | Percent |
|---|---|
| $SiO_2$ | 57.3 |
| $Al_2O_3$ | 21.8 |
| MgO | 20.5 |

EXAMPLE 8

In a mixer provided with horizontal arms, introduction is made of 2 kg. of silica sol containing 30% by weight of silica, the pH of which is adjusted to about 6 by means of concentrated nitric acid. 268 g. of powdered alumina monohydrate of the boehmite variety having a specific surface of 133 m.²/g., the crystals of which have a lamellar shape, are added with kneading until a smooth and homogeneous paste is obtained. 290 g. of hydrated magnesia, of the brucit form, very finely crushed in a ball mill and dispersed in 270 g. of water are added. The pH will be about 9. The kneading is continued until a very fluid suspension is obtained which is then constituted of spherical particles titrating 36% by weight of oxides after calcination at 1000° C. A fraction of these particles, used as type samples, directly dried in a drying oven at 110° C., has a specific surface of 140 m.²/g. which, after calcination at 600° C., increases to 170 m.²/g. A second fraction, conditioned in a damp closed atmosphere at 90° C. for 15 hours, is then dried in a drying oven at 110° C.

The specific surface of the second fraction is 580 m.²/g. and decreases only to 535 m.²/g. after calcination at 600° C. The structure determined by X-ray of only the dry particles on the one hand and the particles treated at 90° C. on the other hand shows for the latter almost total disappearance of the lines of the boehmite and of the brucit and the appearance of lines characterizing an ultra-fine phyllitous silicate of the clay type, as well as those of spinel traces.

The preceding examples are not given by way of limitation since many changes may be applied to the methods described and to the compositions without digressing from the present invention.

Thus, for instance, all of the processes of mixture and kneading, securing a good homogeneity of the materials without destroying the formed spherical particles, can be used for working out the process of the present invention and particularly continuous processes of kneading or mixing.

Continuous drying processes can be used and although they are not a part of the present invention, can be employed after a process of continuous kneading.

Considering compositions, many other oxides or hydroxides of other metals at different states, and particularly in the form of sols or suspensions, can be introduced into the compositions obtained in accordance with the process of the present invention and particularly sols or suspensions of titanium, zirconium, iron, nickel, chromium, molybdenum, tungsten, vanadium, thorium, and rare earth metal hydroxides. Finally, noble metals can be brought, for example, in the state of an acidic solution during formation of the hydroxide paste.

It will be understood that changes may be made in the details of formulation and operation without departing from the spirit of the invention, especially as defined in the following claims.

I claim:

1. A process for the preparation of spherical particles based on oxides in which the spherical particles are characterized by high mechanical solidity comprising preparing by working an aqueous mixture of at least two oxides selected from the group consisting of the oxides of aluminum, silicon and magnesium in the form of sols or peptized suspensions in which the total concentration of the oxides is at least 2 moles per liter, adding a base to raise the pH of the mixture to flocculate the mixture, continuing to work the flocculated mixture in aqueous medium to form an aqueous suspension of spherical particles, and drying the spherical particles.

2. The process as claimed in claim 1 in which the spherical particles are washed before drying.

3. The process as claimed in claim 1 in which the working is in the form of a continuous kneading operation.

4. The process as claimed in claim 3 which includes the step of heating the mixture during the kneading operation.

5. The process as claimed in claim 1 which includes the step of thermally treating the spherical particles.

6. The process as claimed in claim 5 in which treatment is carried out at low temperature.

7. The process as claimed in claim 5 in which the treatment is carried out at low temperature and in the presence of steam.

8. Spherical particles prepared by the process of claim 1.

References Cited

UNITED STATES PATENTS

| 2,459,903 | 1/1949 | Voorhees | 252—448X |
| 2,471,000 | 5/1949 | Messenger | 252—448 |
| 2,813,836 | 11/1957 | Lebeis | 252—448 |

PATRICK P. GARVIN, Primary Examiner